UNITED STATES PATENT OFFICE.

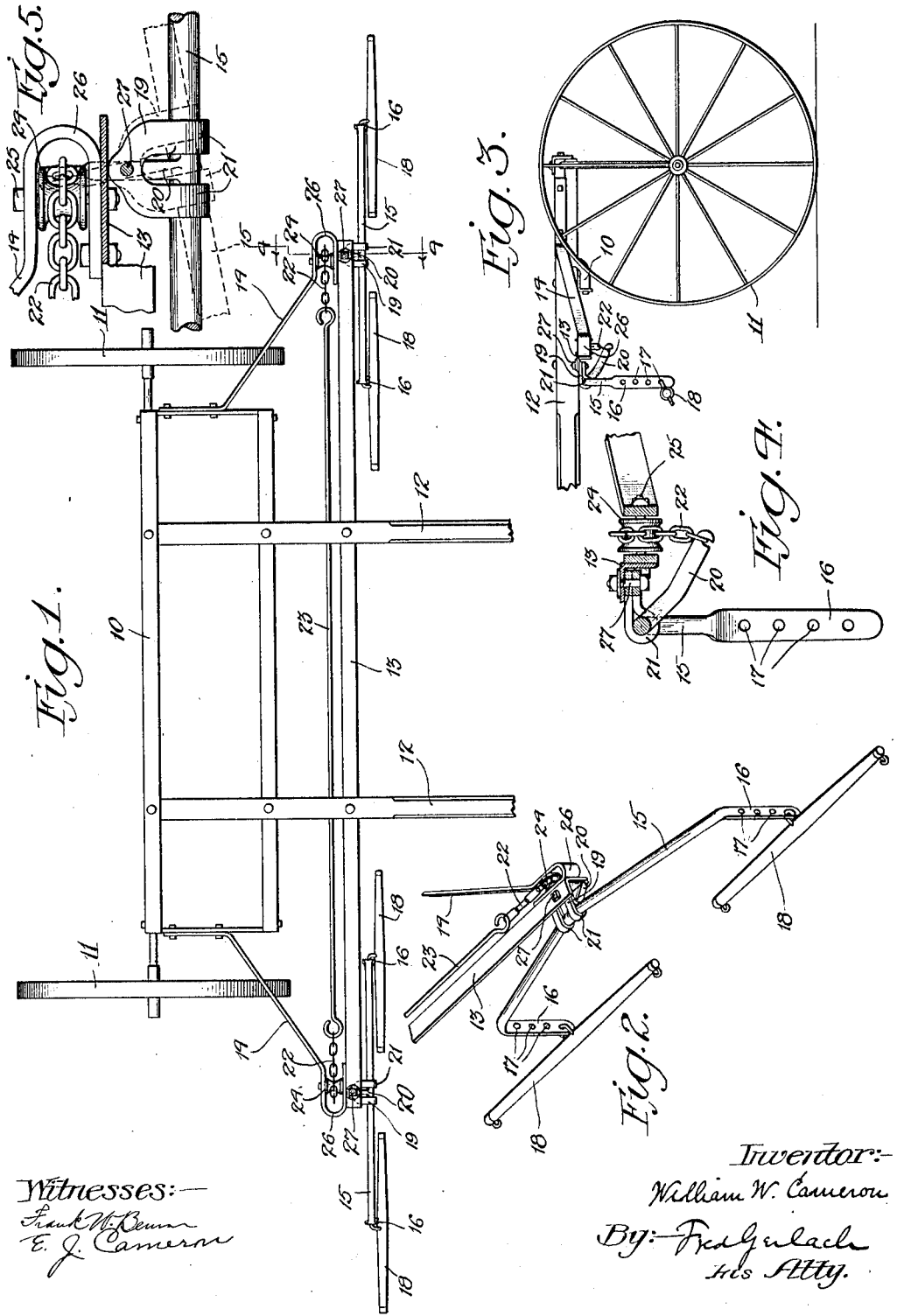
W. W. CAMERON.
DRAFT EQUALIZER.
APPLICATION FILED DEC. 16, 1910.
1,039,253.
Patented Sept. 24, 1912.

WILLIAM W. CAMERON, OF LA CROSSE, WISCONSIN, ASSIGNOR TO LA CROSSE PLOW COMPANY, OF LA CROSSE, WISCONSIN, A CORPORATION OF WISCONSIN.

DRAFT-EQUALIZER.

1,039,253.  Specification of Letters Patent.  Patented Sept. 24, 1912.

Application filed December 16, 1910. Serial No. 597,701.

*To all whom it may concern:*

Be it known that I, WILLIAM W. CAMERON, a resident of La Crosse, in the county of La Crosse and State of Wisconsin, have invented certain new and useful Improvements in Draft-Equalizers, of which the following is a full, clear, and exact description.

The invention relates to draft-equalizers of the type employed on wheel cultivators or other implements or vehicles in which there are two horses hitched on each side of the machine.

In draft-equalizers of this type, as heretofore constructed, some of the draft-arms have been pivotally connected to the draft-bars for the purpose of equalizing the draft between the horses at each side of the machine, and the present invention designs to eliminate so far as possible, the pivotal connections between the draft-arms and the draft bars, so that both of the draft arms for one side of the implement, will be rigid on the draft-bar at that side and so that another rigid arm on the draft-bar may be utilized to operate the equalizing-connection between the draft bars at the opposite sides.

One object of the invention is to provide simple and efficient devices for equalizing the draft between the horses at the opposite sides of the machine.

The invention consists in the several novel features hereinafter set forth, and more particularly defined by claims at the conclusion hereof.

In the drawings: Figure 1 is a plan of a vehicle embodying the invention. Fig. 2 is a perspective of a portion of the improved equalizer. Fig. 3 is a side-elevation. Fig. 4 is a section on an enlarged scale, taken on line 4—4 of Fig. 1. Fig. 5 is a perspective of the horizontally swinging bracket in which one of the draft-bars is pivotally held.

A two-row cultivator frame 10 is mounted upon carrying wheels 11, in any suitable manner, as well understood in the art. Tongues 12 are secured to the frame and a cross-bar member 13, usually formed by angle iron, is secured to said tongue and has its outer ends secured to the frame by braces 14.

A draft bar 15 is provided at each side of the machine or vehicle, and each of said bars is provided at its ends with downwardly extending draft-arms 16 having a series of holes 17 therein, whereby a swingle-tree 18 may be adjustably connected to each of these arms. By connecting the swingle-trees to these arms by means of these different holes the elevation of the hitch may be readily varied, so that the draft will be properly applied to the implement. Said arms are integrally formed with the draft-bars 15 and the latter are each pivotally held in a bracket 19 so that the draft arms 16 thereon may swing in vertical planes to operate an equalizing-connection between the draft-bar at one side to which one team is hitched, and draft-bar at the other side to which the other team is hitched. This equalizing-connection consists of downwardly and rearwardly extending arm 20 on each of the draft-bars 15 disposed between the sides or members 21 of the brackets 19; chains or flexible connectors 22 connected to the rear ends of said arms 20 respectively and a connecting rod 23 between chains 22. Each chain 22 passes around a sheave 24 which is journaled to a bolt 25 in a looped terminal 26 of one of the braces 14. Resultantly, when the draft of the team at one side exceeds the draft of the team at the other side, draft-arms 16 at one side will rock their draft-bar 15 and its arm 20 in the pivotal connection in one of the brackets 19, to operate equalizing-connection 22, 23 and to swing the arm 20, draft-bar 15 and draft-arm 16 at the other side of the machine in the opposite direction to equalize the draft between the teams. Arms 20 and 16 are integral with their draft-bars and arms 20 fit between the spaces between the bracket-sides so they will hold the draft-bars against longitudinal movement in the brackets 19.

In order to equalize the draft of the horses of each team, the draft-bars are sustained to swing horizontally, so that excess draft on one of the swingle-trees thereon will draw the other swingle-tree thereon backwardly, and for this purpose the brackets 19 in which the draft-bars are pivoted are each pivoted to swing horizontally, so that the draft-bars may not only be rocked about a horizontal axis, but will also be free to swing laterally to equalize the draft between the horses of each team.

Each bracket 19 is pivotally connected to the horizontal flange of cross-bar 13 by a bolt 27. Resultantly, each draft bar is sustained so that it can swing laterally or about a vertical axis for the purpose of equalizing the draft between the horses of each team, and each bar is also free to swing or rock about a horizontal axis responsively to either of the teams to equalize the draft between the teams at opposite sides of the vehicle. Chains 22 serve as flexible elements between the equalizing cross-connection and the arms 20 on the draft-bars so that said arms may swing laterally with the draft bars and brackets 19, without substantial effect upon the cross-connection through which the draft between the teams will be equalized.

The invention thus provides an improved draft-equalizer in which provision is made for equalizing the draft between the team at one side and that at the other, as well as equalizing the draft between the horses of each team.

The construction is simple in that the draft-arms and the central arms for operating the equalizing connection may be rigid on or integrally formed with the draft-bars, and is one whereby equalization is efficiently effected.

The invention is not to be understood as restricted to the details set forth since these may be modified within the scope of the appended claims, without departing from the spirit and scope of the invention.

What I claim as new and desire to secure by Letters Patent, is:

1. In a draft equalizer, the combination of a support, a draft-bar at each side, pivotal connections for the draft-bars respectively which permit them to swing laterally, a plurality of draft-arms rigid on each draft-bar and capable of swinging with said bars respectively, pivotal connections for said bars which permit them to be rocked in fore and aft direction by said arms, and a connection between the bars for operating one from the other when they are rocked by said arms.

2. In a draft-equalizer, the combination of a support, a draft-bar at each side, brackets for the draft-bars respectively pivoted to swing laterally, a plurality of draft-arms rigid on each bar and capable of swinging laterally with said bars respectively, pivotal bearings for said bars in said brackets which permit the bars to be rocked by the fore and aft swing of the arms, and a connection between the bars for operating one from the other when the draft-arms rock said bars in their bearings.

3. In a draft-equalizer, the combination of a support, a draft-bar at each side, brackets for the draft-bars respectively which permit them to swing laterally, said brackets having openings therein, a pair of draft-arms rigid on each bar and capable of swinging laterally with said bars respectively, bearings in said brackets which permit the bars to be rocked by the fore and aft swing of the arms, a rigid arm on each of the draft-bars and disposed in the openings in the brackets, and an equalizing connection between said latter brackets.

4. In a vehicle or implement, the combination of a support, a draft-bar at each side, each bar having draft-arms rigid on each of its ends, brackets in which said draft-bars are pivoted to permit said arms to rock vertically, pivotal connections between the brackets and said support, for permitting the brackets to swing laterally, an arm rigid on each of said draft bars and adjacent the brackets respectively, an equalizing connection between the latter arms, comprising a flexible element at each side, and guides for said elements.

5. In a vehicle or implement, the combination of a support, a draft-bar on each side, each bar having draft-arms at its ends, pivotal connections for said bars which permit them to swing laterally and which permit the arms to swing vertically, an arm on each of said draft-bars adjacent the pivotal connections, an equalizing-connection between said latter arms, comprising flexible elements, guides for said elements, and braces having looped ends in which said guides are held.

WILLIAM W. CAMERON.

Witnesses:
C. W. DICKINSON,
LYDA NELSON.

---

Copies of this patent may be obtained for five cents each, by addressing the "Commissioner of Patents, Washington, D. C."